United States Patent
Dasari et al.

(10) Patent No.: US 9,003,172 B2
(45) Date of Patent: Apr. 7, 2015

(54) INTELLIGENTLY CONTROLLING LOADING OF LEGACY OPTION ROMS IN A COMPUTING SYSTEM

(75) Inventors: Shiva R. Dasari, Austin, TX (US);
Raghuswamyreddy Gundam, Austin, TX (US); Newton P. Liu, Austin, TX (US); Douglas W. Oliver, Round Rock, TX (US); Terence Rodrigues, Austin, TX (US); Mehul M. Shah, Austin, TX (US); Wingcheung Tam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 13/476,230

(22) Filed: May 21, 2012

(65) Prior Publication Data

US 2013/0311761 A1     Nov. 21, 2013

(51) Int. Cl.
*G06F 9/24*          (2006.01)
*G06F 9/44*          (2006.01)

(52) U.S. Cl.
CPC ............... *G06F 9/24* (2013.01); *G06F 9/4401* (2013.01); *G06F 9/4411* (2013.01)

(58) Field of Classification Search
CPC ........ G06F 9/24; G06F 9/4411; G06F 9/4401
USPC .......................................................... 713/1
See application file for complete search history.

(56) References Cited

U.S. PATENT DOCUMENTS

| | | | |
|---|---|---|---|
| 5,974,546 A | 10/1999 | Anderson | |
| 6,513,114 B1 * | 1/2003 | Wu et al. | ............... 713/2 |
| 6,647,434 B1 | 11/2003 | Kamepalli | |
| 6,961,848 B2 | 11/2005 | Fish et al. | |
| 7,051,137 B2 | 5/2006 | Poisner | |
| 7,127,603 B2 | 10/2006 | Rangarajan et al. | |
| 7,200,744 B2 | 4/2007 | Yoon et al. | |
| 7,398,380 B1 | 7/2008 | Lovett et al. | |
| 7,426,592 B2 | 9/2008 | Chen | |
| 8,078,865 B2 | 12/2011 | Brumley et al. | |
| 2005/0027908 A1 * | 2/2005 | Ong et al. | ............... 710/62 |

(Continued)

OTHER PUBLICATIONS

IBM, "Mechanism for Supporting Out of Band Configuration of BIOS Settings", IP.com Prior Art Database, IPCOM000033503D, Dec. 13, 2004, pp. 1-2, USA.

*Primary Examiner* — Thomas Lee
*Assistant Examiner* — Danny Chan
(74) *Attorney, Agent, or Firm* — Edward J. Lenart; Mark McBurney; Biggers Kennedy Lenart Spraggins LLP

(57) ABSTRACT

Intelligently loading legacy option ROMs in a computing system, including: generating, by a legacy option ROM manager, an inventory for the computing system, wherein the inventory for the computing system identifies one or more devices in the computing system; determining, by the legacy option ROM manager for each option ROM available for loading, whether a device supported by the option ROM is included in the inventory for the computing system; responsive to determining that the device supported by the option ROM is not included in the inventory for the computing system, preventing the option ROM from being loaded into an option ROM address space; and responsive to determining that the device supported by the option ROM is included in the inventory for the computing system, enabling the option ROM to be loaded into the option ROM address space.

9 Claims, 3 Drawing Sheets

(56) References Cited

U.S. PATENT DOCUMENTS

| | | |
|---|---|---|
| 2005/0027976 A1* | 2/2005 | Stephan et al. .................... 713/1 |
| 2005/0108515 A1* | 5/2005 | Rangarajan et al. ............. 713/2 |
| 2005/0182913 A1* | 8/2005 | Zimmer ........................ 711/207 |
| 2007/0208883 A1* | 9/2007 | Bircher et al. .................... 710/8 |
| 2007/0220196 A1* | 9/2007 | Rydman ........................ 711/102 |
| 2009/0271599 A1 | 10/2009 | Huang |
| 2013/0080754 A1* | 3/2013 | Ganesh et al. .................... 713/2 |

* cited by examiner

INTELLIGENTLY CONTROLLING LOADING OF LEGACY OPTION ROMS IN A COMPUTING SYSTEM

BACKGROUND OF THE INVENTION

1. Field of the Invention

The field of the invention is data processing, or, more specifically, methods, apparatus, and products for intelligently loading legacy option ROMs in a computing system.

2. Description of Related Art

Modern computing systems can operate in legacy mode in which the computing system behaves in a way different from its standard operation in order to support older software, data, or expected behavior. When operating in legacy mode, the computing system may not be able to initialize all devices within the computing system during startup as the result of operating limitations placed on the computing system when operating in legacy mode.

SUMMARY OF THE INVENTION

Methods, apparatus, and products for intelligently loading legacy option ROMs in a computing system, including: generating, by a legacy option ROM manager, an inventory for the computing system, wherein the inventory for the computing system identifies one or more devices in the computing system; determining, by the legacy option ROM manager for each option ROM available for loading, whether a device supported by the option ROM is included in the inventory for the computing system; responsive to determining that the device supported by the option ROM is not included in the inventory for the computing system, preventing, by the legacy option ROM manager, the option ROM from being loaded into an option ROM address space; and responsive to determining that the device supported by the option ROM is included in the inventory for the computing system, enabling, by the legacy option ROM manager, the option ROM to be loaded into the option ROM address space.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Example methods, apparatus, and products for intelligently loading legacy option ROMs in a computing system (200) in accordance with the present invention are described with reference to the accompanying drawings, beginning with FIG. 1. Historically firmware that supports peripherals and other devices in a computing system was stored in Read Only Memory. As such, the firmware is now referred to as a ROM even though the firmware may be stored in any type of memory. That is, the term option ROM is a term of art rather than acronym referring to read only memory.

Figure 1:
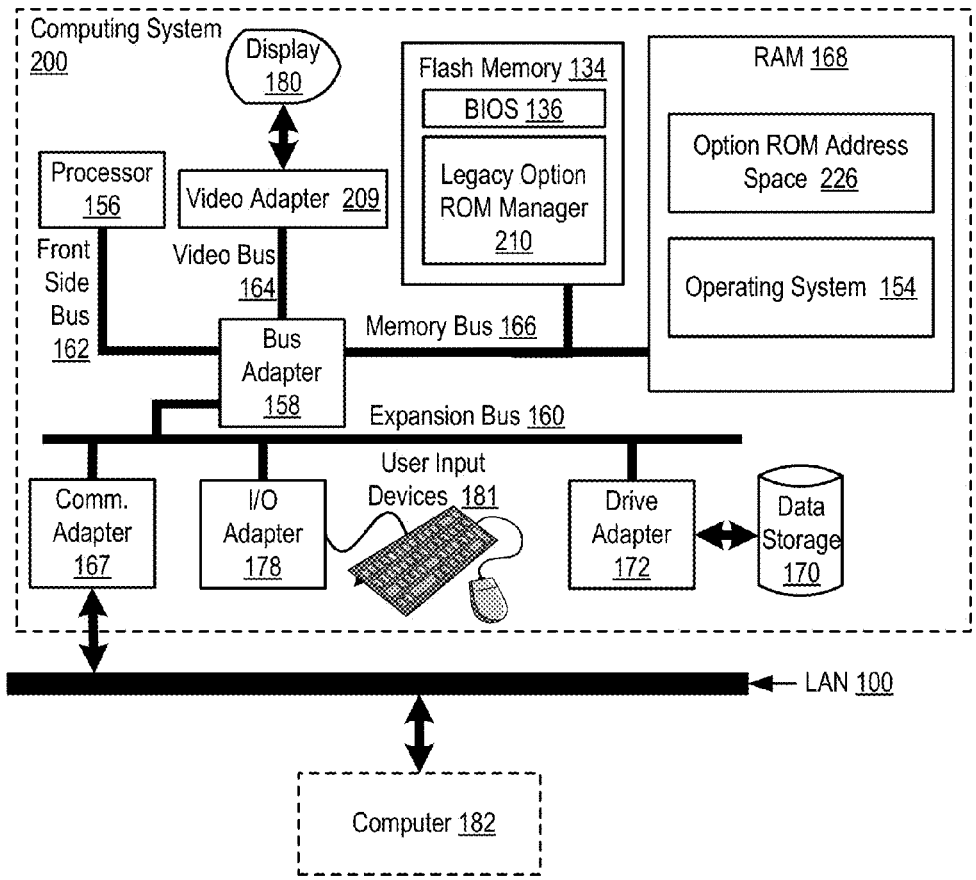
FIG. 1 sets forth a block diagram of automated computing machinery comprising an example computing system useful in intelligently loading legacy option ROMs in a computing system according to embodiments of the present invention.

FIG. 1 sets forth a block diagram of automated computing machinery comprising an example computing system (200) useful in intelligently loading legacy option ROMs in a computing system according to embodiments of the present invention. The computing system (200) of FIG. 1 includes at least one computer processor (156) or 'CPU' as well as random access memory (168) ('RAM') which is connected through a high speed memory bus (166) and bus adapter (158) to processor (156) and to other components of the computing system (200).

Stored in RAM (168) is an option ROM address space (226), a segment of computer memory for loading one or more option ROMs that support various devices within the computing system (200), such as the video adapter (209), communications adapter (167), data storage (170) device, and so on. Also stored RAM (168) is an operating system (154). Operating systems useful in intelligently loading legacy option ROMs in a computing system (200) according to embodiments of the present invention include UNIX™ Linux™ Microsoft XP™ AIX™ IBM's i5/OS™ and others as will occur to those of skill in the art. The operating system (154) and option ROM address space (226) in the example of FIG. 1 are shown in RAM (168), but many components of such software typically are stored in non-volatile memory also, such as, for example, on a disk drive (170).

The computing system (200) of FIG. 1 includes disk drive adapter (172) coupled through expansion bus (160) and bus adapter (158) to processor (156) and other components of the computing system (200). Disk drive adapter (172) connects non-volatile data storage to the computing system (200) in the form of disk drive (170). Disk drive adapters useful in computing systems (200) configured for intelligently loading legacy option ROMs in a according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (200) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (200) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computing system (200) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computing systems (200) configured for intelligently loading legacy option ROMs according to embodiments of the present invention include modems for wired dial-up communications, Ethernet (IEEE 802.3) adapters for wired data communications network communications, and 802.11 adapters for wireless data communications network communications.

The computing system (200) of FIG. 1 also includes flash memory (134). The flash memory (134) of FIG. 1 represents non-volatile computer memory that can be electrically erased and reprogrammed. In the example of FIG. 1, the flash memory (134) includes system basic input output system ('BIOS') (136). The BIOS (136) includes computer program instructions that are the first instructions executed by the computing system (200) when the computing system (200) is powered on. The BIOS (136) can carry out functions such as, for example, identifying devices installed within the computing system (200), initiating a boot loader, configuring system hardware, enabling system components, and so on.

Also stored in the flash memory (134) is a legacy option ROM manager (210). The legacy option ROM manager (210) of FIG. 1 may be embodied as a module of computer program instructions that, when executed, controls which available option ROMs are to be loaded in the computing system (200). The legacy option ROM manager (210) of FIG. 1 may be included, for example, in system BIOS (136) that is used to boot the computing system (200). The option ROM manager is described as a 'legacy' option ROM manager (210) because the legacy option ROM manager (210) can control which option ROMs are loaded when the computing system (200) is operating in legacy mode—a state in which the computing system (200) behaves in a way different from its standard operation in order to support older software, data, or expected behavior. The legacy option ROM manager (210) may therefore be configured to manage an option ROM address space (226) for loading option ROMs to be used by devices within the computing system (200) that is smaller in size than an option ROM address space that would be available when the computing system (200) is not operating in legacy mode.

In the example of FIG. 1, the legacy option ROM manager (210) may be configured to intelligently load legacy option ROMs in the computing system (200) by generating an inventory for the computing system (200). The inventory for the computing system (200) identifies one or more devices that are included as part of the computing system (200). The inventory for the computing system (200) may identify devices that are included in the computing system (200) such as, for example, expansion cards, network adapters, data storage devices, and so on. Generating an inventory for the computing system (200) may be carried out, for example, by examining a boot list that identifies devices that are to be booted during startup of the computing system (200), through the use of presence detection techniques such as those presence detect techniques executed during power-on self-test ('POST') of the computing system (200) that enable the computing system (200) to discover devices attached to the computing system (200), and so on.

In the example of FIG. 1, the legacy option ROM manager (210) may be configured to further intelligently load legacy option ROMs in the computing system (200) by determining, for each option ROM available for loading, whether a device supported by the option ROM is included in the inventory for the computing system (200). When operating in legacy mode, the computing system (200) may not enable every device in the computing system (200). For example, a boot list to be used when booting the computing system (200) in legacy mode may not include certain memory devices or networking devices in the list of items to be booted. Likewise, the inventory may only include those network adapters that are connected to a data communications network. As such, although a particular option ROM may be available for loading, the option ROM may not need to be loaded for a particular device that is not on the boot list or otherwise actively in use.

In the example of FIG. 1, the legacy option ROM manager (210) may be further configured to intelligently load legacy option ROMs in the computing system (200) by preventing, the option ROM from being loaded into an option ROM address space (226) in response to determining that the device supported by the option ROM is not included in the inventory for the computing system (200). Preventing the option ROM from being loaded into an option ROM address space (226) may be carried out, for example, by removing the option ROM or the associated device from a boot list, by blocking the BIOS from loading the option ROM into option ROM address space (226), and in other ways as will occur to those of skill in the art.

In the example of FIG. 1, the legacy option ROM manager (210) may be configured to further intelligently load legacy option ROMs in the computing system (200) by enabling the option ROM to be loaded into the option ROM address space (226) in response to determining that the device supported by the option ROM is included in the inventory for the computing system (200). Enabling the option ROM to be loaded into the option ROM address space (226) may be carried out, for example, by adding the option ROM or the associated device to a boot list, by allowing the BIOS to load the option ROM into option ROM address space (226), and in other ways as will occur to those of skill in the art.

Figure 2:
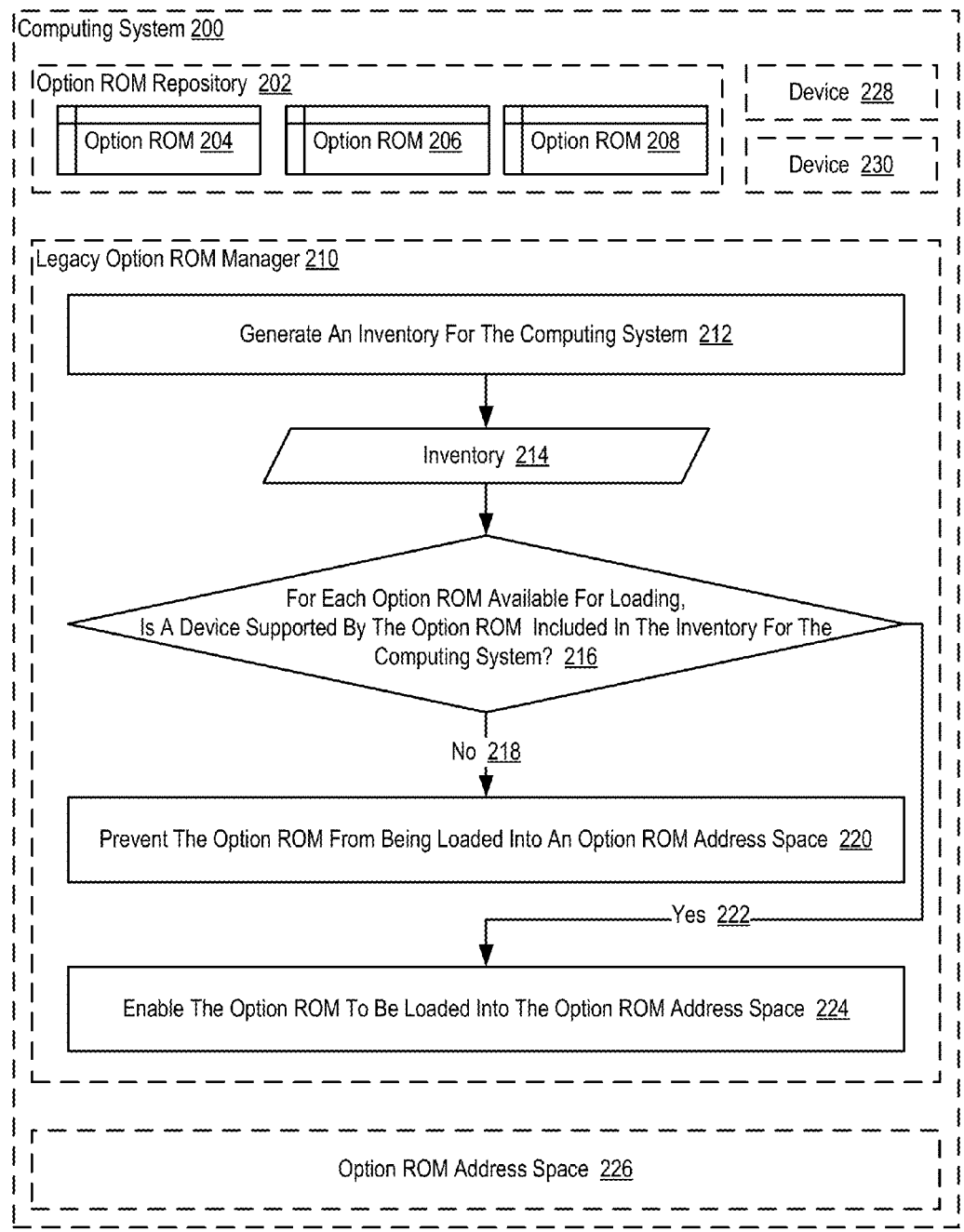
FIG. 2 sets forth a flow chart illustrating an example method for intelligently loading legacy option ROMs in a computing system according to embodiments of the present invention.

For further explanation, FIG. 2 sets forth a flow chart illustrating an example method for intelligently loading legacy option ROMs (204, 206, 208) in a computing system (200) according to embodiments of the present invention. In the example method of FIG. 2, an option ROM (204, 206, 208) may be embodied as computer memory that includes firmware that is called by a system BIOS. Each option ROM (204, 206, 208) may support a particular device (228, 230) within the computing system (200) such as, for example, a network interface controller ('NIC'), a hard drive, a video adapter, and so on. In the example method of FIG. 2, an option ROM (204, 206, 208) is loaded during the boot process for the computing system (200), thereby enabling the operation of the device (228, 230) that is supported by the option ROM (204, 206, 208).

The computing system (200) of FIG. 2 includes a legacy option ROM manager (210). The legacy option ROM manager (210) of FIG. 2 may be embodied as a module of computer program instructions that, when executed, controls which available option ROMs (204, 206, 208) are to be loaded in the computing system (200). The legacy option ROM manager (210) of FIG. 2 may be included, for example, in system BIOS that is used to boot the computing system (200). In the example method of FIG. 2, the option ROM manager is described as a 'legacy' option ROM manager (210) because the legacy option ROM manager (210) can control which option ROMs (204, 206, 208) are loaded when the computing system (200) is operating in legacy mode—a state in which the computing system (200) behaves in a way different from its standard operation in order to support older software, data, or expected behavior. The legacy option ROM manager (210) of FIG. 2 may therefore be configured to manage an option ROM address space (226) for loading option ROMs (204, 206, 208) to be used by devices within the computing system (200) that is smaller in size than an option ROM address space that would be available when the computing system (200) is not operating in legacy mode.

The example method of FIG. 2 includes generating (212), by the legacy option ROM manager (210), an inventory (214) for the computing system (200). In the example method of FIG. 2, the inventory (214) for the computing system (200) identifies one or more devices (228, 230) that are included as part of the computing system (200). The inventory (214) for the computing system (200) may identify devices (228, 230) that are included in the computing system (200) such as, for example, expansion cards, network adapters, data storage devices, and so on. In the example method of FIG. 2, generating (212) an inventory (214) for the computing system (200) may be carried out, for example, by examining a boot list that identifies devices that are to be booted during startup of the computing system (200), through the use of presence detection techniques such as those presence detect techniques executed during POST of the computing system (200) that enable the computing system (200) to discover devices (228, 230) attached to the computing system (200), and so on.

The example method of FIG. 2 also includes determining (216), by the legacy option ROM manager (210) for each option ROM (204, 206, 208) available for loading, whether a device supported by the option ROM is included in the inventory (214) for the computing system (200). When operating in legacy mode, the computing system (200) may not enable every device in the computing system (200).

For example, a boot list to be used when booting the computing system (200) in legacy mode may not include certain memory devices or networking devices in the list of items to be booted. Likewise, the inventory (214) may only include those network adapters that are connected to a data communications network. As such, although a particular option ROM (204, 206, 208) may be available for loading, the option ROM (204, 206, 208) may not need to be loaded for a particular device that is not on the boot list or otherwise actively in use.

The example method of FIG. 2 also includes preventing (220), by the legacy option ROM manager (210), the option ROM from being loaded into an option ROM address space (226) in response to determining that the device supported by the option ROM is not (218) included in the inventory (214) for the computing system (200). In the example method of FIG. 2, preventing (220) the option ROM from being loaded into an option ROM address space (226) may be carried out, for example, by removing the option ROM or the associated device from a boot list, by blocking the BIOS from loading the option ROM into option ROM address space (226), and in other ways as will occur to those of skill in the art.

The example method of FIG. 2 also includes enabling (224), by the legacy option ROM manager (210), the option ROM to be loaded into the option ROM address space (226) in response to determining that the device supported by the option ROM is (222) included in the inventory (214) for the computing system (200). In the example method of FIG. 2, enabling (224) the option ROM to be loaded into the option ROM address space (226) may be carried out, for example, by adding the option ROM or the associated device to a boot list, by allowing the BIOS to load the option ROM into option ROM address space (226), and in other ways as will occur to those of skill in the art.

Figure 3:
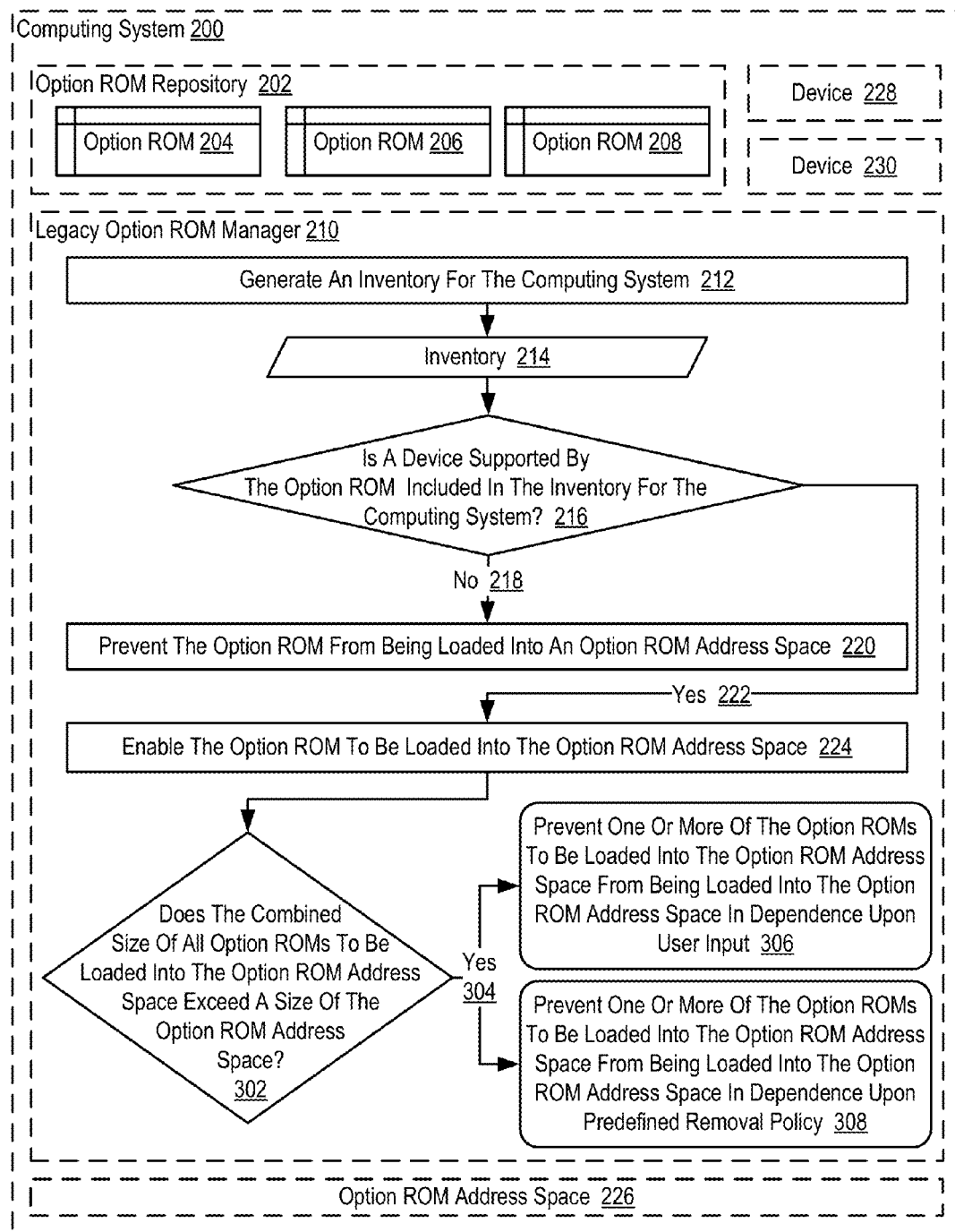
FIG. 3 sets forth a flow chart illustrating an example method for intelligently loading legacy option ROMs in a computing system according to embodiments of the present invention.

For further explanation, FIG. 3 sets forth a flow chart illustrating an example method for intelligently loading legacy option ROMs (204, 206, 208) in a computing system (200) according to embodiments of the present invention. The example method of FIG. 3 is similar to the example method of FIG. 2 as it also includes generating (212) an inventory (214) for the computing system (200), determining (216) whether a device supported by the option ROM is included in the inventory (214) for the computing system (200), preventing (220) the option ROM from being loaded into an option ROM address space (226) in response to determining that the device supported by the option ROM is not (218) included in the inventory (214) for the computing system (200), and enabling (224) the option ROM to be loaded into the option ROM address space (226) in response to determining that the device supported by the option ROM is (222) included in the inventory (214) for the computing system (200).

The example method of FIG. 3 also includes determining (302), by the legacy option ROM manager (210), whether a combined size of all option ROMs to be loaded into the option ROM address space (226) exceeds a size of the option ROM address space (226). In the example method of FIG. 3, determining (302) whether a combined size of all option ROMs to be loaded into the option ROM address space (226) exceeds a size of the option ROM address space (226) may be carried out by summing up the size of each option ROM to be loaded into the option ROM address space (226) and comparing the sum to the size of the option ROM address space (226). As described above, the size of the option ROM address space (226) of may be reduced when the computing system (200) is operating in legacy mode.

Consider an example in which the size of the option ROM address space (226) of may be set to 128 kilobytes when the computing system (200) is operating in legacy mode. In such an example, if three options ROMs are to be loaded into the option ROM address space (226) and each option ROM is 32 kilobytes in size, all three option ROMs may be loaded into the option ROM address space (226). If each option ROM is 64 kilobytes, however, only two of the option ROMs may be loaded into the option ROM address space (226).

The example method of FIG. 3 can also include preventing (306), by the legacy option ROM manager (210), one or more of the option ROMs to be loaded into the option ROM address space (226) from being loaded into the option ROM address space (226) in response responsive to determining that the combined size of all option ROMs to be loaded into the option ROM address space (226) exceeds (304) the size of the option ROM address space (226). In the example method of FIG. 3, preventing (306) one or more of the option ROMs to be loaded into the option ROM address space (226) from being loaded into the option ROM address space (226) is carried out in dependence upon user input. In the example method of FIG. 3, the user input may be received, for example, from a system administrator through a system management terminal. The system administrator may be presented with a list of option ROMs that can be loaded into the option ROM address space (226) and may subsequently select one or more option ROMs to be loaded into the option ROM address space (226) so long as the combined size of the selected option ROMs does not exceed the size of the option ROM address space (226). The system administrator may therefore be presented with information such as the size of the option ROM address space (226), the size of each option ROM that is available for selection, and so on.

The example method of FIG. 3 can alternatively include preventing (308), by the legacy option ROM manager (210), one or more of the option ROMs to be loaded into the option ROM address space (226) from being loaded into the option ROM address space (226) in response responsive to determining that the combined size of all option ROMs to be loaded into the option ROM address space (226) exceeds (304) the size of the option ROM address space (226). In the example method of FIG. 3, preventing (308) one or more of the option ROMs to be loaded into the option ROM address space (226) from being loaded into the option ROM address space (226) is carried out in dependence upon a predefined removal policy. A predefined removal policy represents a set of rules to determine which option ROMs are loaded into the option ROM address space (226)—and which option ROMs are not loaded into the option ROM address space (226)—when the combined size of all option ROMs to be loaded into the option ROM address space (226) exceeds (304) the size of the option ROM address space (226). In the example method of FIG. 3, the predefined removal policy may include rules specifying that the least memory intensive option ROMs are loaded first, rules specifying that option ROMs associated with particular devices are loaded first, and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of intelligently loading legacy option ROMs in a computing system, the method comprising:
   generating, by a legacy option ROM manager, an inventory for the computing system, wherein the inventory for the computing system identifies one or more devices in the computing system;
   determining, by the legacy option ROM manager for each option ROM available for loading, whether a device supported by the option ROM is included in the inventory for the computing system;
   responsive to determining that the device supported by the option ROM is not included in the inventory for the computing system, preventing, by the legacy option ROM manager, the option ROM from being loaded into an option ROM address space;
   responsive to determining that the device supported by the option ROM is included in the inventory for the computing system, enabling, by the legacy option ROM manager, the option ROM to be loaded into the option ROM address space;
   determining, by the legacy option ROM manager, whether a combined size of all option ROMs to be loaded into the option ROM address space exceeds a size of the option ROM address space; and
   responsive to determining that the combined size of all option ROMs to be loaded into the option ROM address space exceeds the size of the option ROM address space, preventing, by the legacy option ROM manager, one or more of the option ROMs to be loaded into the option ROM address space from being loaded into the option ROM address space in dependence upon a predefined removal policy.

2. The method of claim 1 wherein the inventory for the computing system includes one or more memory devices.

3. The method of claim 1 wherein the inventory for the computing system includes one or more network interface devices that are actively connected to a data communications network.

4. An apparatus for intelligently loading legacy option ROMs in a computing system, the apparatus comprising a computer processor, a computer memory operatively coupled to the computer processor, the computer memory having disposed within it computer program instructions that, when executed by the computer processor, cause the apparatus to carry out the steps of:
   generating, by a legacy option ROM manager, an inventory for the computing system, wherein the inventory for the computing system identifies one or more devices in the computing system;
   determining, by the legacy option ROM manager for each option ROM available for loading, whether a device supported by the option ROM is included in the inventory for the computing system;
   responsive to determining that the device supported by the option ROM is not included in the inventory for the computing system, preventing, by the legacy option ROM manager, the option ROM from being loaded into an option ROM address space;
   responsive to determining that the device supported by the option ROM is included in the inventory for the computing system, enabling, by the legacy option ROM manager, the option ROM to be loaded into the option ROM address space;
   determining, by the legacy option ROM manager, whether a combined size of all option ROMs to be loaded into the option ROM address space exceeds a size of the option ROM address space; and
   responsive to determining that the combined size of all option ROMs to be loaded into the option ROM address space exceeds the size of the option ROM address space, preventing, by the legacy option ROM manager, one or more of the option ROMs to be loaded into the option ROM address space from being loaded into the option ROM address space in dependence upon a predefined removal policy.

5. The apparatus of claim 4 wherein the inventory for the computing system includes one or more memory devices.

6. The apparatus of claim 4 wherein the inventory for the computing system includes one or more network interface devices that are actively connected to a data communications network.

7. A computer program product for intelligently loading legacy option ROMs in a computing system, the computer program product disposed upon a computer readable storage medium, wherein the computer readable storage medium is not a signal, the computer program product comprising computer program instructions that, when executed, cause a computer to carry out the steps of:
   generating, by a legacy option ROM manager, an inventory for the computing system, wherein the inventory for the computing system identifies one or more devices in the computing system;
   determining, by the legacy option ROM manager for each option ROM available for loading, whether a device supported by the option ROM is included in the inventory for the computing system;
   responsive to determining that the device supported by the option ROM is not included in the inventory for the computing system, preventing, by the legacy option ROM manager, the option ROM from being loaded into an option ROM address space;
   responsive to determining that the device supported by the option ROM is included in the inventory for the computing system, enabling, by the legacy option ROM manager, the option ROM to be loaded into the option ROM address space;
   determining, by the legacy option ROM manager, whether a combined size of all option ROMs to be loaded into the option ROM address space exceeds a size of the option ROM address space; and
   responsive to determining that the combined size of all option ROMs to be loaded into the option ROM address space exceeds the size of the option ROM address space, preventing, by the legacy option ROM manager, one or more of the option ROMs to be loaded into the option ROM address space from being loaded into the option ROM address space in dependence upon a predefined removal policy.

8. The computer program product of claim 7 wherein the inventory for the computing system includes one or more memory devices.

9. The computer program product of claim 7 wherein the inventory for the computing system includes one or more network interface devices that are actively connected to a data communications network.

* * * * *